(12) United States Patent
Wertz et al.

(10) Patent No.: US 10,697,719 B2
(45) Date of Patent: Jun. 30, 2020

(54) MONITORING A RECIRCULATING COOLING SYSTEM FOR BACTERIAL GROWTH

(71) Applicant: International Business Machines Corporation, Armonk, NY (US)

(72) Inventors: Jason T. Wertz, Pleasant Valley, NY (US); Joseph Kuczynski, North Port, FL (US); Bradford O. Brooks, Walsenburg, CO (US); Donald W. Porter, Highland, NY (US); Allan C. Vandeventer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 16/059,690

(22) Filed: Aug. 9, 2018

(65) Prior Publication Data
US 2020/0049435 A1 Feb. 13, 2020

(51) Int. Cl.
  *F28F 27/02* (2006.01)
  *F28F 25/02* (2006.01)
  *C02F 103/02* (2006.01)

(52) U.S. Cl.
  CPC .............. *F28F 27/02* (2013.01); *F28F 25/02* (2013.01); *C02F 2103/023* (2013.01);
  (Continued)

(58) Field of Classification Search
  None
  See application file for complete search history.

(56) References Cited

U.S. PATENT DOCUMENTS 5,015,436 A * 5/1991 Nagase .................. G21C 15/28
                                                   376/306
5,349,874 A * 9/1994 Schapira ................ G01N 17/00
                                                    73/86
(Continued)

FOREIGN PATENT DOCUMENTS

CN            107090399 A        8/2017

OTHER PUBLICATIONS

Xia, Y., et al., "Bandpass Particle Sorting in Cascade Acoustofluidic System for Drinking Water Monitoring," in Solid-State Sensors, Actuators, and Microsystems (Transducers), Transducers—2015 (IEEE), 18th International Conference on, pp. 1814-1817 (2015) (Year: 2015).*

(Continued)

*Primary Examiner* — Chester T Barry
(74) *Attorney, Agent, or Firm* — Robert J. Shatto

(57) ABSTRACT

A recirculating cooling system includes a coolant sampling line, a deterministic lateral displacement (DLD) microfluidic separation device, a monitoring device, and an alert generation device. The coolant sampling line is in fluid communication with a recirculating coolant line, and the DLD microfluidic separation device receives a coolant sample diverted into the coolant sampling loop from the recirculating coolant line via the coolant sampling line. The DLD microfluidic separation device includes a separation array for separating bacteria into an output channel according to a size threshold. The monitoring device monitors a characteristic property of the coolant sampling loop for comparison to a threshold for bacterial growth in the recirculating cooling system. The alert generation device generates an alert to remediate the bacterial growth in the recirculating cooling system responsive to the characteristic property of the coolant sampling loop satisfying the threshold.

18 Claims, 4 Drawing Sheets

(52) U.S. Cl.
CPC ....... *C02F 2307/14* (2013.01); *F28F 2265/06* (2013.01); *F28F 2265/20* (2013.01); *F28F 2265/22* (2013.01)

(56) References Cited

U.S. PATENT DOCUMENTS

| | | | | |
|---|---|---|---|---|
| 5,821,066 | A * | 10/1998 | Pyle | C07K 16/12 435/7.2 |
| 8,263,023 | B2 | 9/2012 | Le Vot et al. | |
| 8,596,462 | B2 | 12/2013 | Parfitt et al. | |
| 9,394,618 | B1 * | 7/2016 | Bellows | C23G 1/103 |
| 2003/0059328 | A1 * | 3/2003 | Sundstrom | F04C 29/042 418/84 |
| 2003/0186331 | A1 * | 10/2003 | Vesey | C12Q 1/02 435/7.2 |
| 2005/0072743 | A1 * | 4/2005 | Schneider | C02F 1/722 210/759 |
| 2005/0089441 | A1 * | 4/2005 | Coffey | C02F 1/02 422/1 |
| 2007/0026381 | A1 * | 2/2007 | Huang | B01L 3/502746 435/4 |
| 2007/0205142 | A1 | 9/2007 | Parfitt et al. | |
| 2009/0286300 | A1 | 11/2009 | Le Vot et al. | |
| 2013/0015137 | A1 * | 1/2013 | Urmenyi | B01D 37/04 210/654 |
| 2013/0026105 | A1 * | 1/2013 | Duarte | C02F 5/083 210/696 |
| 2013/0266669 | A1 * | 10/2013 | Jiang | C02F 1/50 424/725 |
| 2015/0166986 | A1 | 6/2015 | Boles et al. | |
| 2015/0167051 | A1 * | 6/2015 | Jasko, III | C12Q 1/66 165/11.1 |
| 2017/0248508 | A1 * | 8/2017 | Ward | G01N 33/5091 |
| 2018/0093023 | A1 | 4/2018 | Gifford et al. | |
| 2018/0369816 | A1 * | 12/2018 | Ai | B01L 3/502761 |

OTHER PUBLICATIONS

Reynolds, D.T. et al., "Detection of Cryptosporidium oosysts in water: techniques for generating precise recovery data," J. Appl. Microbio., 1999, 87, pp. 804-813 (Year: 1999).*

Ranjan et al., *DLD pillar shape design for efficient separation of spherical and non-spherical bioparticles*, Lab on a Chip, Sep. 2014, pp. 4250-4262, vol. 14, Royal Society of Chemistry, London.

Devendra et al., *Gravity Driven Deterministic Lateral Displacement for Particle Separation in Microfluidic Devices*, Analytical Chemistry, Nov. 2012, pp. 10621-10627, vol. 84, Issue 24, American Chemical Society, Washington, D.C..

McGrath et al., *Deterministic lateral displacement for particle separation: a review*, Lab on a Chip, Sep. 2014, pp. 4139-4158, vol. 14, Royal Society of Chemistry, London.

Wunsch et al., *Nanoscale lateral displacement arrays for the separation of exosomes and colloids down to 20 nm*, Nature Nanotechnology, Nov. 2016, pp. 936-942, vol. 11, Macmillan Publishers Limited, part of Springer Nature, London.

Przybylski et al., "Allergic Early Detection Wearable Device," U.S. Appl. No. 16/223,515, filed Dec. 18, 2018.

* cited by examiner

MONITORING A RECIRCULATING COOLING SYSTEM FOR BACTERIAL GROWTH

BACKGROUND

In recirculating cooling water systems, biofilm formation due to bacterial growth is unavoidable. Standard design practices for such cooling systems specify addition of a biocide to the cooling fluid. However, no biocide retains its antibacterial efficacy indefinitely. Consequently, the cooling fluid has to be periodically sampled for bacterial growth. Where growth exceeds a certain threshold, preventative maintenance is required. Such maintenance may involve actions ranging from draining, flushing, or recharging the coolant loop to hardware replacement in severe cases where biofilm has clogged the heat exchangers. Since bacterial growth rates in the field are difficult to predict, there is a risk of hardware being fouled by biofilms prior to scheduled preventive maintenance.

SUMMARY

According to an embodiment, a recirculating cooling system is disclosed. The recirculating cooling system includes a coolant sampling line, a deterministic lateral displacement (DLD) microfluidic separation device, a monitoring device, and an alert generation device. The coolant sampling line is in fluid communication with a recirculating coolant line, and the DLD microfluidic separation device receives a coolant sample diverted into the coolant sampling loop from the recirculating coolant line via the coolant sampling line. The DLD microfluidic separation device includes a separation array for separating bacteria into an output channel according to a size threshold. The monitoring device monitors a characteristic property of the coolant sampling loop for comparison to a threshold for bacterial growth in the recirculating cooling system. The alert generation device generates an alert to remediate the bacterial growth in the recirculating cooling system responsive to the characteristic property of the coolant sampling loop satisfying the threshold.

According to another embodiment, a recirculating cooling system is disclosed. The recirculating cooling system includes a coolant sampling line, a DLD microfluidic separation device, a monitoring device, and an alert generation device. The coolant sampling line is in fluid communication with a recirculating coolant line, and the DLD microfluidic separation device receives a coolant sample diverted into a coolant sampling loop from the recirculating coolant line via the coolant sampling line. The DLD microfluidic separation device includes a first separation array for separating first bacteria into a first output channel according to a first size threshold and a second separation array for separating second bacteria into a second output channel according to a second size threshold. The monitoring device estimates bacterial count based on first image data collected at the first output channel and second image data collected at the second output channel. The alert generation device generates an alert to remediate bacterial growth in the recirculating cooling system responsive to the bacterial count satisfying a threshold for bacterial growth in the recirculating cooling system.

According to yet another embodiment, process of monitoring a recirculating cooling system for bacterial growth is disclosed. The process includes diverting a coolant sample from a recirculating coolant line of a recirculating cooling system into a coolant sampling loop. The process includes utilizing a DLD microfluidic separation device including at least one separation array to separate bacteria in the coolant sample into a particular output channel according to a particular size threshold. The process also includes monitoring a characteristic property of the coolant sampling loop and comparing the characteristic property of the coolant sampling loop to a threshold for bacterial growth in the recirculating cooling system. The process further includes generating an alert to remediate the bacterial growth in the recirculating cooling system responsive to determining that the characteristic property of the coolant sampling loop satisfies the threshold.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Deterministic lateral displacement (DLD) is a passive separation technique that utilizes a specific arrangement of pillars within a channel to precisely control the trajectory of and facilitate separation of particles of varying sizes. A DLD microfluidic separation device may include a pillar gradient array (also referred to as a "DLD array" or a "DLD pillar array"), where each successive row of pillars is shifted laterally at a set distance from a previous row of pillars. This arrangement creates separate flow laminae which follow known paths through the DLD array. Larger particles are bumped off their original fluid paths and displaced laterally to follow the pillar gradient, while smaller particles continue in their original fluid paths unaffected by the DLD array. DLD techniques have been used to separate a wide range of particles, from nanometer-sized particles to millimeter-sized particles, including bacteria.

The present disclosure describes a recirculating cooling system with a coolant sampling loop that incorporates a DLD microfluidic separation device including a separation array (or multiple separation arrays) designed to separate bacteria into a particular output channel according to a particular size threshold. Since virgin coolant (e.g., distilled water) is a simple solution (i.e., there are no suspended particles), nothing will initially accumulate in the output channels of the separation array(s). Once bacteria infiltrate the coolant sampling loop, the bacteria are laterally displaced toward a collection wall of the separation array into a collection output. The bacteria may be monitored visually (via an imaging/camera system), via a pressure drop (e.g., via a piezoelectric sensor), or by some other detector known to those skilled in the art. If a bacteria "count" or other characteristic property of the coolant sampling loop exceeds a threshold trigger level, an alert may be generated so that an appropriate remediation action may be undertaken. Thus, the system of the present disclosure may function as an "early warning system" for the presence of bacteria in the recirculating cooling system to reduce the risk of hardware being fouled by biofilms prior to scheduled preventive maintenance.

Figure 1:
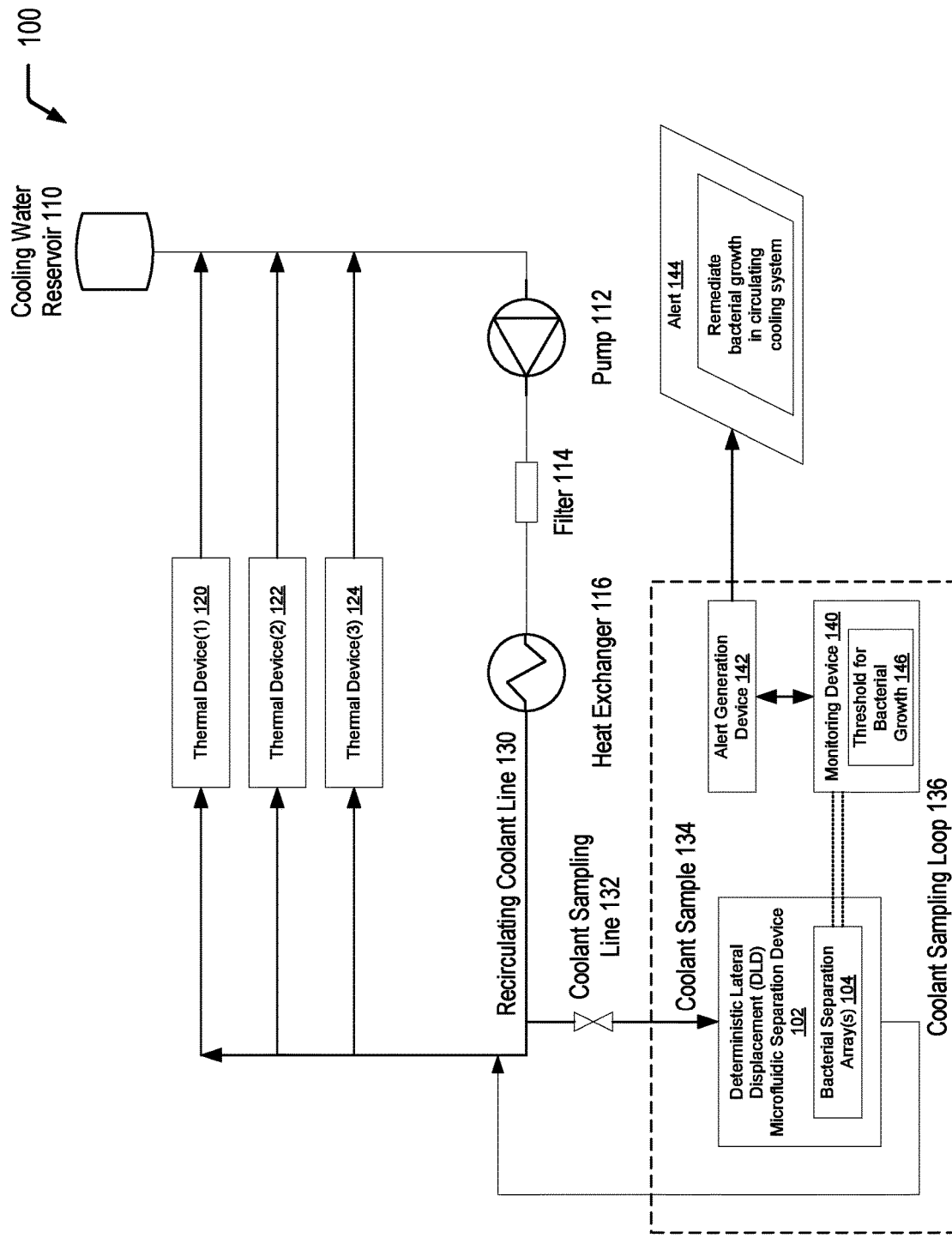
FIG. 1 illustrates an example of a recirculating cooling system that includes a DLD microfluidic separation device to separate bacteria from a coolant sample for monitoring bacterial growth in the recirculating cooling system, according to one embodiment.

FIG. 1 is a diagram depicting a recirculating cooling system 100 that includes a DLD microfluidic separation device 102 for monitoring bacterial growth in the recirculating cooling system 100. The DLD microfluidic separation device 102 includes a separation array 104 (or multiple separation arrays) designed to laterally displace bacteria into a particular output channel according to a particular size threshold, as illustrated and described further herein with respect to the examples depicted in FIG. 2 (a single separation array) and FIG. 3 (multiple separation arrays).

In the simplified example depicted in FIG. 1, the recirculating cooling system 100 includes a cooling water reservoir 110, a pump 112, a filter 114, and a heat exchanger 116 for dissipating heat from multiple thermal devices (e.g., multiple computing resources of a liquid-cooled supercomputer). For ease of illustration, FIG. 1 depicts a first thermal device 120, a second thermal device 122, and a third thermal device 124 as representative examples of numerous thermal devices that are cooled using cooling water in a recirculating coolant line 130.

The recirculating cooling system 100 includes a coolant sampling line 132 that is in fluid communication with the recirculating coolant line 130. The DLD microfluidic separation device 102 is configured to receive a coolant sample 134 diverted into a coolant sampling loop 136 from the recirculating coolant line 130 via the coolant sampling line 132. A monitoring device 140 is configured to measure a characteristic property of the coolant sampling loop 136 for comparison to a threshold 146 indicative of bacterial growth in the recirculating cooling system 100. An alert generation device 142 is configured to generate an alert 144 to remediate the bacterial growth in the recirculating cooling system 100 responsive to the characteristic property of the coolant sampling loop 136 satisfying the threshold 146. In some cases, the alert 144 may be transmitted via a network to personnel associated with performing preventive maintenance on the recirculating cooling system 100, such as in the form a text message, an email message, or some other communications means. Such personnel may be local or remote, and the alert 144 may provide sufficient notice to address the bacterial growth before hardware is fouled by biofilms.

While not shown in the example of FIG. 1, the alert generation device 142 may also be configured to initiate an automated remedial action responsive to determining that the characteristic property of the coolant sampling loop 136 satisfies the threshold 146. In a particular embodiment, the automated remedial action may include the introduction of a biocide into the recirculating coolant line 130. To illustrate, the cooling water reservoir 110 may include a purge coupling where a biocide reservoir (not shown) may be coupled, and the alert generation device 142 may be configured to send instructions to trigger release of biocide from the biocide reservoir. As another example, the heat exchanger 116 may include a drain port where a biocide reservoir (not shown) may be coupled, and the alert generation device 142 may be configured to send instructions to trigger release of biocide from the biocide reservoir. As a further example, the automated remedial action may include rotating a cartridge containing biocide into a flow path of the recirculating coolant line 130.

In some embodiments, the monitoring device 140 includes an imaging device (see e.g. FIGS. 2 and 3) to collect image data for one or more output channels of the separation array 104. The imaging device may include software, hardware or a combination thereof capable of estimating a "count" of bacteria in a particular output channel of the separation array 104 based on the image data. In this case, the characteristic property of the coolant sampling loop 136 corresponds to an estimated bacterial count, and the threshold 146 corresponds to a threshold bacterial count indicative of bacterial growth in the recirculating cooling system 100. When the bacterial count satisfies the threshold 146, the alert generation device 142 may generate the alert 144 to remediate the bacterial growth.

In some embodiments, the monitoring device 140 includes a pressure sensor (e.g., a piezoelectric sensor) to measure a fluid pressure change in the coolant sampling loop 136. In this case, the characteristic property of the coolant sampling loop 136 corresponds to the change of fluid pressure. When the change of fluid pressure satisfies a threshold pressure change indicative of bacterial growth in the recirculating cooling system 100, the alert generation device 142 generates the alert 144 to remediate the bacterial growth.

Figure 3:
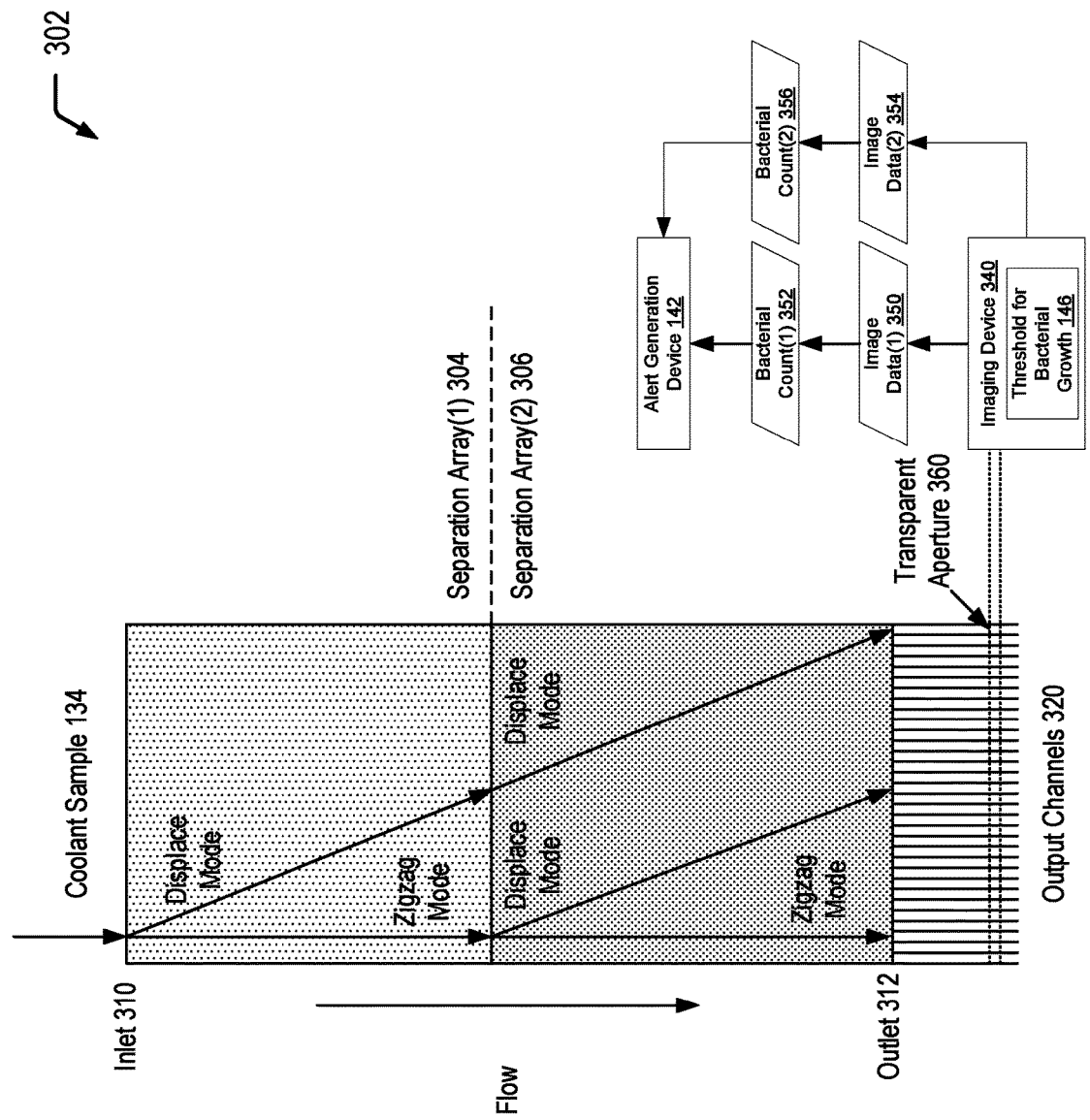
FIG. 3 illustrates an example of multiple separation arrays that may be utilized to separate bacteria into a particular output channel according to a particular size threshold for monitoring bacterial growth in a recirculating cooling system, according to one embodiment.

As illustrated in the example of FIG. 3, several separation arrays may be employed when it is desirable to have more than one size-based separation. By having several arrays with a sequentially decreasing critical dimension, it may be possible to separate bacteria according to various size thresholds. A first example of such a design is a "multiple array" for use where the largest particle dimension is no larger than the gap size of the final array. A second example is a "chirped array" where a row shift fraction is varied to increase separation range and reduce clogging in comparison to a multiple array. As the row shift fraction increases, the displacement angle also increases. A third example is a "cascade array" with separate non-clogging outflows to increase the separation range further.

In cases where multiple separation arrays are employed, such as in the example depicted in FIG. 3, the alert 144 may include information regarding particular bacteria when an estimated bacterial count at a particular output channel satisfies a particular bacterial count threshold. To illustrate, one separation array may enable first bacteria (e.g., rod-shaped bacteria) satisfying a first size threshold to be displaced into a first output channel, while another separation array may enable second bacteria (e.g., round-shaped bacteria) satisfying a second size threshold to be displaced into a second output channel. In this example, the alert 144 may include information regarding the first bacteria (e.g., "Remediate *bacillus* bacteria") when an estimated bacterial count at the first output channel satisfies the threshold 146. Alternatively, the alert 144 may include information regarding the second bacteria (e.g., "Remediate coccus bacteria") when an estimated bacterial count at the second output channel satisfies the threshold 146.

Thus, FIG. 1 illustrates an example of a recirculating cooling system that includes a DLD microfluidic separation device to enable monitoring of bacterial growth in the recirculating cooling system. The DLD microfluidic separation device is positioned in a coolant sampling loop to divert a coolant sample into a DLD pillar array that is designed for separating bacteria according to a particular size threshold (or multiple thresholds). As illustrated and further described herein, the DLD pillar array may have a single-array design (see FIG. 2) for bacterial separation according to a single size threshold or a multiple-array design (see FIG. 3) for bacterial separation according to multiple size thresholds. The presence of bacteria in the coolant sample may affect a characteristic property of the coolant sampling loop. A change of the characteristic property may provide an early warning of an increased number of bacteria in the recirculating cooling system. Generating an alert when the characteristic property satisfies a threshold for bacterial growth enables a remediation action to be performed in order to reduce the risk of hardware being fouled by biofilms prior to scheduled preventive maintenance.

Figure 2:
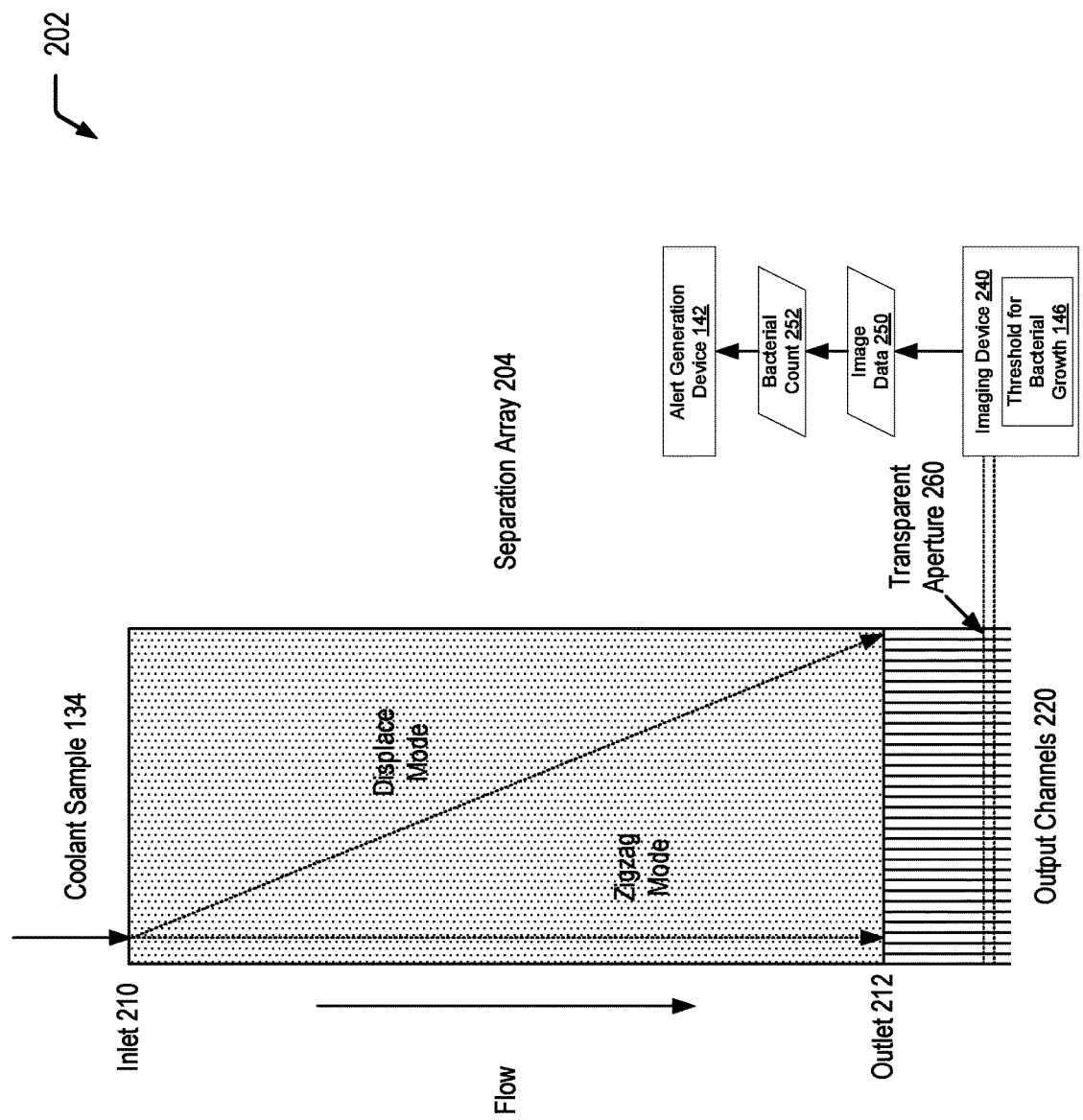
FIG. 2 illustrates an example of a separation array that may be utilized to separate bacteria into an output channel according to a size threshold for monitoring bacterial growth in a recirculating cooling system, according to one embodiment.

Referring to FIG. 2, a diagram depicts a portion of a DLD microfluidic separation device 202 including a separation array 204 for separation of bacteria into an output channel according to a size threshold, according to one embodiment. FIG. 2 depicts an example of a single-array design for separating bacteria from the coolant sample 134 according to a single size threshold. In a particular embodiment, the separation array 204 may be fabricated using standard lithography procedures. For example, the separation array 204 may correspond to a polydimethylsiloxane (PDMS) array manufactured from a silicon resist based on a design to achieve lateral displacement of particles according to a particular size threshold.

The coolant sample 134 enters at an inlet 210 of the DLD microfluidic separation device 202 and exits at an outlet 212 of the DLD microfluidic separation device 202 (for re-insertion into the recirculating coolant line 130). Particles (e.g., bacteria) in the coolant sample 134 that do not satisfy the size threshold are not affected by the pillars of the separation array 204 and continue in a streamline toward the outlet 212 (in a "zigzag" mode). Particles in the coolant sample 134 that satisfy the size threshold are laterally displaced in a direction toward a collection wall of the DLD microfluidic separation device 202 (in a displacement mode) into a particular output channel of multiple output channels 220 that are positioned at the outlet 212. In a particular embodiment, the size threshold may correspond to a characteristic bacterial dimension in a range of 0.2 microns to 10 microns.

Cocci bacteria have a spherical shape, with the characteristic bacterial dimension of a coccus bacterium corresponding to an approximate particle diameter. Bacilli (rod shape) bacteria having a nearly one-dimensional shape (as well as "rod-like" bacteria with a shape that lies between rod shape and spherical shape) introduce added complexity into a design for the separation array 204 due to a large number of possible orientations for such bacteria in a fluid medium. To achieve separation of such bacteria from the coolant sample 134 based on a longest dimension (typically identified as a "length"), some pillar shapes have been shown to induce rotation and/or flipping for presentation of different particle orientations. Such particle re-orientations may assist with fluid streamline changes as the longest dimension of the particle opens up. For example, "I-shaped" pillars and "L-shaped" pillars may be satisfactory to induce rotation of a rod-shaped bacterium, enabling lateral displacement according to a size threshold associated with the longest dimension.

FIG. 2 illustrates an embodiment in which the monitoring device 140 of FIG. 1 includes an imaging device 240 configured to collect image data 250 at the particular output channel. The image data 250 is utilized to estimate a bacterial count 252, corresponding to bacteria that satisfied the particular size threshold and that were laterally displaced in the first separation array 204. FIG. 2 illustrates that a transparent aperture 260 may enable the imaging device 240 to collect the image data 250 at the particular output channel (e.g., by focusing a lens at the particular output channel). When the bacterial count 252 satisfies the threshold 146 for bacterial growth in the recirculating cooling system 100, the alert generation device 142 may trigger the alert 144 (see FIG. 1) and/or trigger an automated/semi-automated remediation action such as the insertion of additional/alternative biocide.

Thus, FIG. 2 illustrates an example of a DLD microfluidic separation device with a DLD pillar array having a single-array design for separation of bacteria from a coolant sample according to a single size threshold. As described herein with respect to FIG. 1, the presence of bacteria in the coolant sample may affect a characteristic property of the coolant sampling loop. FIG. 2 depicts an illustrative example in which the characteristic property corresponds to an estimated bacterial count at the output channel, and an imaging device is used to monitor the estimated bacterial count based on image data collected at the output channel. A change of the estimated bacterial count at the output channel may provide an early warning of an increased number of bacteria in the recirculating cooling system. An alert may be generated when the estimated bacterial count at the output channel satisfies a threshold for bacterial growth, enabling a remediation action to be performed in order to reduce the risk of hardware being fouled by biofilms prior to scheduled preventive maintenance.

Referring to FIG. 3, a diagram depicts a portion of a DLD microfluidic device 302 including multiple separation arrays, according to one embodiment. In contrast to the design depicted in FIG. 2 that employs a single separation array, FIG. 3 depicts an example of an alternative design for separating bacteria from the coolant sample 134 according to multiple size thresholds. In the particular embodiment depicted in FIG. 3, the DLD microfluidic device 302 includes a first separation array 304 for separating bacteria according to a first size threshold and a second separation array 306 for separating bacteria according to a second size threshold. It will be appreciated that an alternative number and/or arrangement of separation arrays may be employed. In a particular embodiment, the first and second separation arrays 304, 306 may be fabricated using standard lithography procedures. For example, the first and second separation arrays 304, 306 may correspond to a PDMS array manufactured from a silicon resist based on a design to achieve lateral displacement of particles according to the first and second size thresholds.

The coolant sample 134 enters at an inlet 310 of the DLD microfluidic separation device 302 and exits at an outlet 312 of the DLD microfluidic separation device 302 (for re-insertion into the recirculating coolant line 130). Particles (e.g., bacteria) in the coolant sample 134 that do not satisfy a first size threshold are not affected by the pillars of the first separation array 304 and continue in a streamline toward an input channel of the second separation array 306 (in a "zigzag" mode). Particles in the coolant sample 134 that satisfy the first size threshold are laterally displaced (in a displacement mode) into a different input channel of the second separation array 306.

Particles that satisfied the first size threshold and ones that were laterally displaced in the first separation array 304 may continue in the displacement mode through the second separation array 306 into a first output channel of the multiple output channels 320 at the outlet 312 (adjacent to the collection wall). FIG. 3 illustrates that particles that did not satisfy the first size threshold and that passed through the first separation array 304 in the zigzag mode may continue to flow in the same streamline (zigzag mode) through the second separation array 306 or may be laterally displaced (displacement mode) into a second output channel of the multiple output channels 320 at the outlet 312. Thus, the first separation array 304 separates first bacteria into the first output channel according to the first size threshold, and the second separation array 306 separates second bacteria into the second output channel according to the second size threshold.

FIG. 3 illustrates an embodiment in which the monitoring device 140 of FIG. 1 corresponds to an imaging device 340 configured to collect first image data 350 at the first output channel and to collect second image data 354 at the second output channel. The first image data 350 is utilized to estimate a first bacterial count 352, corresponding to bacteria that satisfied the first size threshold and that were laterally displaced in the first and second separation arrays 304, 306 into the first output channel. The second image data 354 is utilized to estimate a second bacterial count 356, corresponding to bacteria that did not satisfy the first size threshold but that satisfied the second size threshold and were laterally displaced in the second separation array 306 into the second output channel. FIG. 3 illustrates that a transparent aperture 360 may enable the imaging device 340 to collect the first image data 350 at the first output channel and to collect the second image data 354 at the second output channel (e.g., utilizing different lenses to focus on the individual output channels). When the first bacterial count 352 or the second bacterial count 356 satisfies the threshold 146 for bacterial growth in the recirculating cooling system 100, the alert generation device 142 may trigger the alert 144 (see FIG. 1) and/or trigger an automated/semi-automated remediation action such as the insertion of additional/alternative biocide. In some cases, the alert 144 may provide information regarding the particular bacteria that satisfied the threshold 146, such as information identifying the particular bacteria as satisfying either the first size threshold or the second size threshold.

Thus, FIG. 3 illustrates an example of a DLD microfluidic separation device with a DLD pillar array having a multiple-array design for separation of bacteria from a coolant sample according to multiple size thresholds. As described herein with respect to FIG. 1, the presence of bacteria in the coolant sample may affect a characteristic property of the coolant sampling loop. FIG. 3 depicts an illustrative example in which the characteristic property corresponds to an estimated bacterial count at a particular output channel, and an imaging device is used to monitor the estimated bacterial count based on image data collected at the particular output channel. A change of the estimated bacterial count at the particular output channel may provide an early warning of an increased number of bacteria in the recirculating cooling system. An alert may be generated when the estimated bacterial count at the particular output channel satisfies a threshold for bacterial growth, enabling a remediation action to be performed in order to reduce the risk of hardware being fouled by biofilms prior to scheduled preventive maintenance. In some cases, the alert may include information regarding the particular bacteria at the particular output channel. In some cases, such information may be useful for identifying the particular remediation action, such as a particular biocide to be introduced into the recirculating cooling system. To illustrate, when an estimated bacterial count at a first output channel satisfies the threshold, the remedial action may include utilizing a biocide effective against the particular bacteria displaced into the first output channel. When an estimated bacterial count at a second output channel satisfies the threshold, the remedial action may include utilizing a different biocide effective against the particular bacteria displaced into the second output channel.

Figure 4:
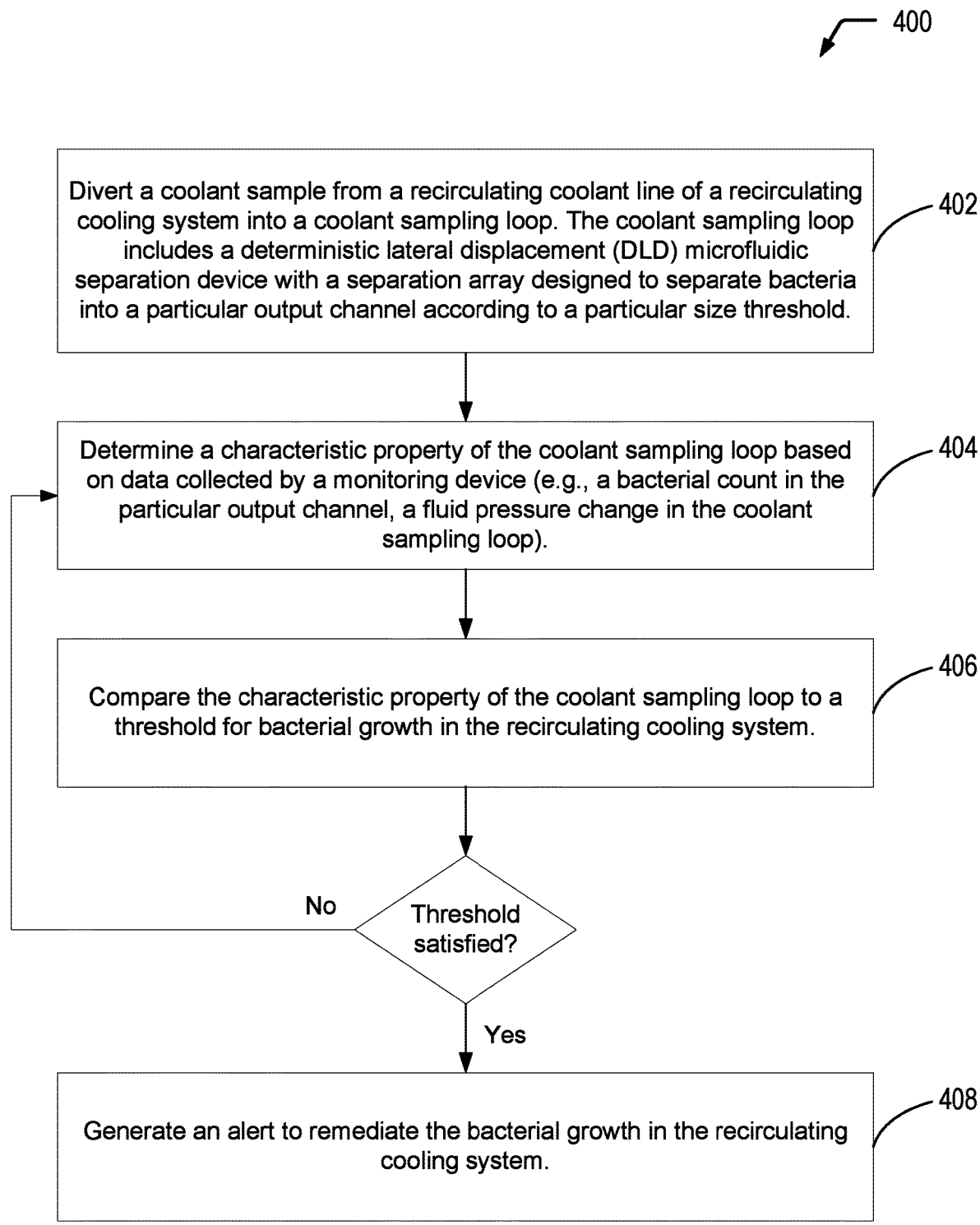
FIG. 4 is a flow diagram illustrating a particular embodiment of a process of monitoring a recirculating cooling system for bacterial growth using a separation array to separate bacteria in a coolant sample into particular output channel according to a particular size threshold.

FIG. 4 is a flow diagram depicting an example of a process 400 of monitoring a recirculating cooling system for bacterial growth, according to one embodiment. In the particular embodiment depicted in FIG. 4, the process 400 includes generating an alert (at 408) in cases where a characteristic of the coolant sampling loop is indicative of bacterial growth in the recirculating cooling system. Alternatively or additionally, the process 400 may include initiating an automated or semi-automated remediation action, such as injecting additional/alternative biocide(s) into the recirculating cooling system from a biocide reservoir (among other possibilities).

The process 400 includes diverting a coolant sample from a recirculating coolant line of a recirculating cooling system into a coolant sampling loop, at 402. The coolant sampling loop includes a DLD microfluidic separation device with a separation array designed to separate bacteria from the coolant sample into a particular output channel according to a particular size threshold. For example, referring to FIG. 1, the coolant sample 134 may be diverted from the recirculating cooling system 100 into the coolant sampling loop 136 via the coolant sampling line 132. The coolant sampling loop 136 includes the DLD microfluidic separation device 102 with the separation array 104 for separation of bacteria from the coolant sample 134. The DLD microfluidic separation device 102 of FIG. 1 may have a single-array design or a multiple-array design. To illustrate, the DLD microfluidic separation device 102 of FIG. 1 may correspond to the DLD microfluidic separation device 202 of FIG. 2, which represents an example of a single-array design that includes the separation array 204 for separation of bacteria according to a single size threshold. Alternatively, the DLD microfluidic separation device 102 of FIG. 1 may correspond to the DLD microfluidic separation device 302 of FIG. 3, which represents an example of a multiple-array design that includes the separation arrays 304, 306 for separation of bacteria according to different size thresholds. It will be appreciated that a variety of array designs (including various pillar shapes) may be utilized for separation of bacteria from the coolant sample 134 according to one or more size thresholds.

The process 400 includes determining a characteristic property of the coolant sampling loop based on data collected by a monitoring device, at 404. For example, referring to FIG. 1, the monitoring device 140 may measure a characteristic property of the coolant sampling loop 136. In a particular embodiment, the characteristic property of the coolant sampling loop 136 corresponds to a bacterial count in a particular output channel. As an example, the monitoring device 140 of FIG. 1 may correspond to the imaging device 240 of FIG. 2 that collects the image data 250 to estimate the bacterial count 252 at one of the output channels 220. As another example, the monitoring device 140 of FIG.

1 may correspond to the imaging device 340 of FIG. 3 that collects the first image data 350 for estimating the first bacterial count 352 at one of the output channels 320 and that collects the second image data 354 for estimating the second bacterial count 356 at another one of the output channels 320. In another embodiment, the characteristic property of the coolant sampling loop 136 may correspond to a fluid pressure change in the coolant sampling loop 136. In this case, the monitoring device 140 of FIG. 1 may correspond to a pressure sensor (e.g., a piezoelectric sensor) to measure the fluid pressure change.

The process 400 includes comparing the characteristic property of the coolant sampling loop to a threshold for bacterial growth in the recirculating cooling system, at 406. For example, referring to FIG. 1, the monitoring device 140 may compare the characteristic property of the coolant sampling loop 136 to the threshold 146 for bacterial growth in the recirculating cooling system 100. To illustrate, in the example depicted in FIG. 2 where the monitoring device 140 corresponds to the imaging device 240, the characteristic property corresponds to a threshold bacterial count, and the bacterial count 252 is compared to the threshold bacterial count. In the example depicted in FIG. 3 where the monitoring device 140 corresponds to the imaging device 340, the characteristic property corresponds to a threshold bacterial count, and the individual bacterial counts 352, 356 are compared to the threshold bacterial count.

In cases where the threshold is not satisfied, the process 400 may return to 404 for a next measurement of the characteristic property of the coolant sampling loop. In cases where the threshold is satisfied, FIG. 4 illustrates a particular embodiment in which the process 400 includes generating an alert to remediate the bacterial growth in the recirculating cooling system, at 408. For example, referring to FIG. 1, the alert generation device 142 may generate the alert 144 to remediate the bacterial growth in the recirculating cooling system 100. In some embodiments, such as the multiple-array design depicted in FIG. 3, the alert 144 may provide information regarding the particular bacteria that satisfied the threshold 146, such as information identifying the particular bacteria as satisfying either the first size threshold or the second size threshold. In some cases, the alert generation device 142 may also initiate an automated or semi-automated remediation action, such as injecting additional/alternative biocide(s) into the recirculating cooling system 100 from a biocide reservoir (among other possibilities).

Thus, FIG. 4 illustrates an example of a process of monitoring a recirculating cooling system for bacterial growth using a DLD microfluidic separation device positioned to receive a coolant sample diverted into a coolant sampling loop. The DLD microfluidic separation device includes at least one separation array for separating bacteria from the coolant sample into a particular output channel according to a particular size threshold. The presence of bacteria in the coolant sample may affect a characteristic property of the coolant sampling loop. A change of the characteristic property may provide an early warning of an increased number of bacteria in the recirculating cooling system. Generating an alert when the characteristic property satisfies a threshold for bacterial growth enables a remediation action to be performed in order to reduce the risk of hardware being fouled by biofilms prior to scheduled preventive maintenance.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A recirculating cooling system comprising:
a coolant sampling line in fluid communication with a recirculating coolant line;
a deterministic lateral displacement (DLD) microfluidic separation device to receive a coolant sample diverted into a coolant sampling loop from the recirculating coolant line via the coolant sampling line, the DLD microfluidic separation device including a separation array for separating bacteria into an output channel according to a size threshold;
a monitoring device to monitor a characteristic property of the coolant sampling loop for comparison to a threshold for bacterial growth in the recirculating cooling system, wherein the monitoring device includes a pressure sensor to monitor a fluid pressure change in the coolant sampling loop, and wherein the characteristic property of the coolant sampling loop corresponds to the fluid pressure change; and
an alert generation device to generate an alert to remediate the bacterial growth in the recirculating cooling system responsive to the characteristic property of the coolant sampling loop satisfying the threshold.

2. The recirculating cooling system of claim 1, wherein the monitoring device further includes an imaging device to collect image data at the output channel, and wherein the characteristic property of the coolant sampling loop corresponds to an estimated bacterial count at the output channel.

3. The recirculating cooling system of claim 2, wherein a transparent aperture enables the imaging device to collect the image data at the output channel.

4. The recirculating cooling system of claim 1, wherein the pressure sensor is a piezoelectric sensor.

5. The recirculating cooling system of claim 1, wherein the size threshold corresponds to a characteristic bacterial dimension in a range of 0.2 microns to 10 microns.

6. The recirculating cooling system of claim 5, wherein the characteristic bacterial dimension corresponds to a longest dimension of a rod-shaped bacterium.

7. The recirculating cooling system of claim 1, wherein the alert generation device is further configured to initiate an automated remedial action responsive to determining that the characteristic property of the coolant sampling loop satisfies the bacterial growth threshold.

8. The recirculating cooling system of claim 7, wherein the automated remedial action includes introduction of a biocide into the recirculating coolant line of the recirculating cooling system.

9. A recirculating cooling system comprising:
a coolant sampling line in fluid communication with a recirculating coolant line;
a deterministic lateral displacement (DLD) microfluidic separation device to receive a coolant sample diverted into a coolant sampling loop from the recirculating coolant line via the coolant sampling line, the DLD microfluidic separation device including a first separation array for separating first bacteria into a first output channel according to a first size threshold and a second separation array for separating second bacteria into a second output channel according to a second size threshold;

a monitoring device to estimate bacterial count based on first image data collected at the first output channel and second image data collected at the second output channel; and an alert generation device to generate an alert to remediate bacterial growth in the recirculating cooling system responsive to the bacterial count satisfying a threshold for bacterial growth in the recirculating cooling system.

10. The recirculating cooling system of claim 9, wherein the alert includes information regarding the first bacteria when an estimated bacterial count at the first output channel satisfies the threshold.

11. The recirculating cooling system of claim 9, wherein the alert includes information regarding the second bacteria when an estimated bacterial count at the second output channel satisfies the threshold.

12. The recirculating cooling system of claim 9, wherein the first bacteria correspond to rod-shaped bacteria, and wherein the second bacteria correspond to round-shaped bacteria.

13. The recirculating cooling system of claim 9, wherein the DLD microfluidic separation device has a multiple array design including the first separation array and the second separation array, a chirped array design including the first separation array and the second separation array, or a cascade array design including the first separation array and the second separation array.

14. A process of monitoring a recirculating cooling system for bacterial growth, the process comprising:

diverting a coolant sample from a recirculating coolant line of a recirculating cooling system into a coolant sampling loop;

utilizing a deterministic lateral displacement (DLD) microfluidic separation device including at least one separation array to separate bacteria in the coolant sample into a particular output channel according to a particular size threshold;

monitoring, using a pressure sensor configured to measure a fluid pressure in the coolant sampling loop, a characteristic property of the coolant sampling loop, wherein the characteristic property includes a fluid pressure change in the coolant sampling loop;

comparing the characteristic property of the coolant sampling loop to a threshold for bacterial growth in the recirculating cooling system; and responsive to determining that the characteristic property of the coolant sampling loop satisfies the threshold, generating an alert to remediate the bacterial growth in the recirculating cooling system.

15. The process of claim 14, wherein the characteristic property of the coolant sampling loop corresponds to an estimated bacterial count at the particular output channel.

16. The process of claim 14, wherein the DLD microfluidic separation device includes first separation array for separating first bacteria into a first output channel according to a first size threshold and a second separation array for separating second bacteria into a second output channel according to a second size threshold.

17. The process of claim 14, further comprising initiating an automated remedial action responsive to determining that the characteristic property of the coolant sampling loop satisfies the threshold.

18. The process of claim 17, wherein initiating the automated remedial action includes automatically introducing a biocide into the recirculating coolant line of the recirculating cooling system.

* * * * *